Jan. 19, 1960 J. R. WILLINGHAM Re. 24,769

HOLE ENLARGING AND FINISHING TOOL

Original Filed Oct. 18, 1954

INVENTOR.
JOHN R. WILLINGHAM
BY William P. Gerald
ATTORNEYS

United States Patent Office

Re. 24,769

Patented Jan. 19, 1960

24,769

HOLE ENLARGING AND FINISHING TOOL

John R. Willingham, Bloomfield Hills, Mich.

Original No. 2,816,464, dated December 17, 1957, Serial No. 462,789, October 18, 1954. Application for reissue May 21, 1959, Serial No. 814,940

2 Claims. (Cl. 77—58)

Matter enclosed in heavy brackets [ ] appears in the original patent but forms no part of this reissue specification; matter printed in italics indicates the additions made by reissue.

This invention relates to a hole enlarging and work piece side wall finishing tool for enlarging the apertures and accurately finishing the side walls of work pieces already having a hole roughly formed therein.

This invention relates to a fluid flushed and cooled hole enlarging work piece side wall finishing tool having chip gathering and flushing cavities in the tip peripheral side wall and a fluid jet for projecting a cooling and flushing stream of fluid against the chips to cool the tool cutting edges and work piece side walls and to dispose of the chips under a jet stream influence.

Hole enlarging and finishing tools have been employed heretofore to facilitate finishing the side walls of a work piece accurately and smoothly, however, the several devices of the prior art have not proven entirely satisfactory inasmuch as they are not capable of accurately and smoothly finishing the holes so as to eliminate grinding or separate finishing after the hole has been axially accurately located, with the result that the multiple finishing tools of the prior art are complicated in design and construction, expensive to manufacture, and difficult to use, due to the fact that the work piece must be moved from machine to machine or else multiple tools used to finish the hole.

With the foregoing in view, the primary object of the invention is to provide a one-operation hole enlarging and finishing tool which accurately locates the apertures axially and which also finishes the side walls of the work piece thereby eliminating the necessity of follow up machining and grinding.

An object of the invention is to provide a hole finishing tool for enlarging and finishing already partially formed holes in work pieces having a central chamber for conducting cooling and flushing fluid to the tip area of the tool.

An object of the invention is to provide a tip on the tool which has a peripheral cavity longitudinally extending partially over the tip area with the cavity area surrounded at the sides and top by a greater than normal radius area so as to contact the side wall of the work piece under pressure in sealing relationship relative to the cavity area to contain the flushing and cooling fluid therein.

An object of the invention is to provide an orifice leading from the shank portion central chamber to the tip cavity whereby fluid under pressure is conducted from the shank chamber to the cavity area.

An object of the invention is to provide a side cutting edge at one side of the tip cavity wall directly in the path of the projecting cooling fluid so that chips developed and accumulated by the side cutting edge are flushed away under jet influence so that the cutting edge and the work piece side wall is kept cool by the flow of the fluid thereby keeping chips cleared so that chip scoring is eliminated.

An object of the invention is to provide end [or bottom] cutting edges [on the same radial plane as the side wall cuuting edges] *arranged* so that the cooling and flushing fluid is projected under [with jet influence] *and* against any chips developed by the [bottom] cutting edges so as to break off the chips and cool the [bottom] cutting edges and the work piece walls as the work progresses.

An object of the invention is to provide a tool with side and end cutting edges on the same radial plane so that they can very easily be sharpened.

These and other objects of the invention will become apparent by reference to the following description of a hole enlarging and work piece side wall finishing tool embodying the invention taken in connection with the accompanying drawing.

Figures 1, 2, 3, 4:
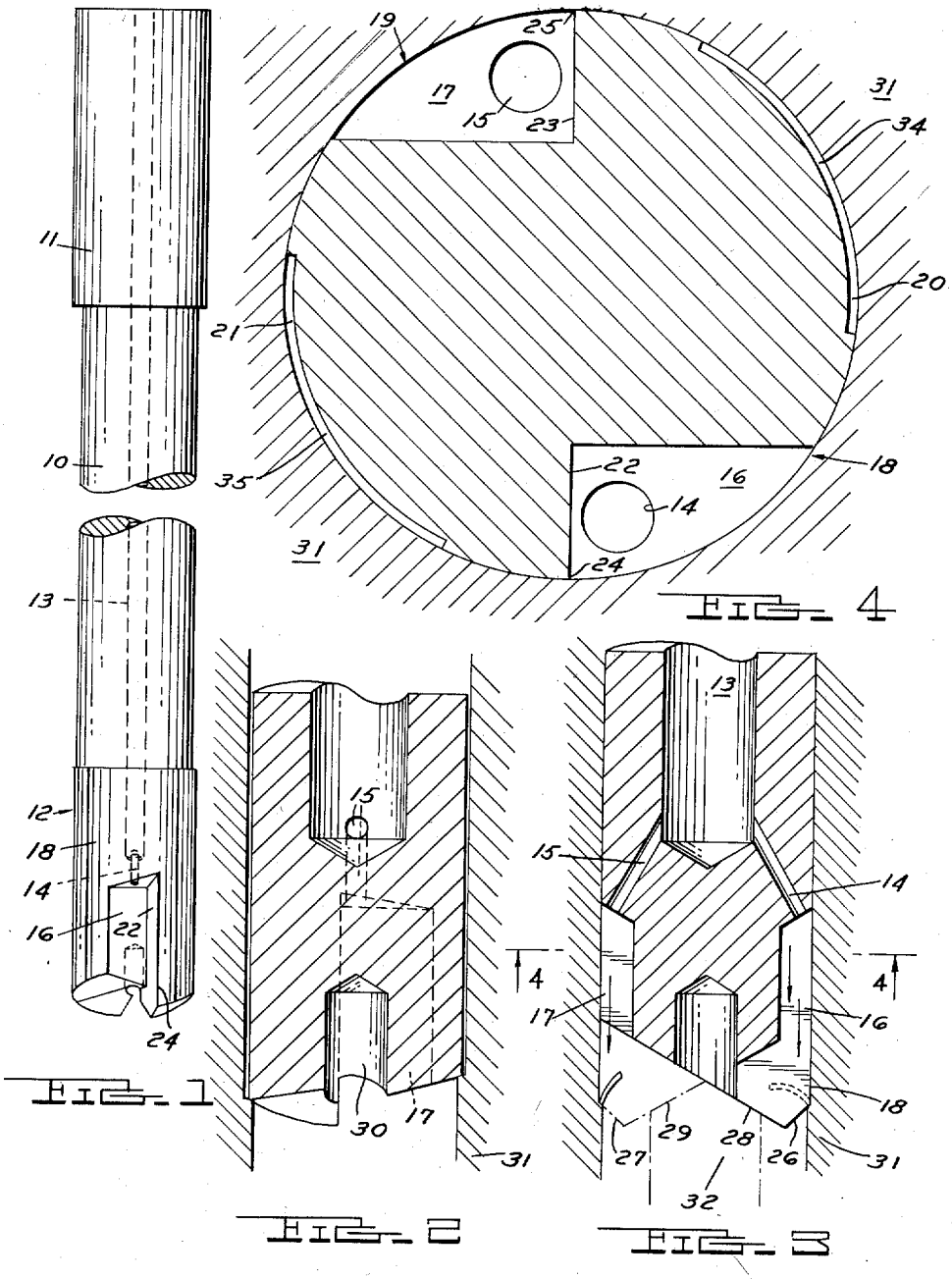
Fig. 1 is a side elevational view of the tool.
Fig. 2 is a longitudinal axial cross-sectional view of the tip area of the tool in conjunction with the work piece.
Fig. 3 is a view similar to Fig. 2 taken at 90° thereof.
Fig. 4 is a cross-sectional view of Fig. 3 taken on the line 4—4 thereof.

Referring now to the drawing wherein like numerals refer to like and corresponding parts throughout the several views, the hole enlarging and work piece side wall finishing tool disclosed therein to illustrate the invention comprises a shank portion 10, a collet end 11, a cutting lip end 12, a hollow interior chamber 13 for conducting cooling and flushing fluid from the head of the machine, not shown, to the orifices 14 and 15 from thence the fluid is conducted to the peripheral cavity areas 16 and 17 which cavities 16 and 17 are surrounded by the raised tip areas 18 and 19 respectively for sealing the area of the drill tip and the cavities against return flow of fluid while the tool is operating in the work piece.

More particularly, the inventive hole enlarging and work piece side wall finishing tool comprises a collet or chuck portion 11 which is shown of cylindrical shape but which can be of any shape to be receivable and securable in the machine head and the shank portion 10 which can be of any desired length and size. The tip portion 12 can be of any size and length but it is essention to so form the tip 12 in its side wall area that it is capable of creating a seal between the work piece side wall around the area of the cavities 16 and 17 and this accomplished by forming the spaced longitudinal side areas 20 and 21 on a normal radius and by forming the raised areas 18 and 19 on the radius greater than normal on both sides and at the top of the cavities 15 and 16 respectively. The cavity defining undercut walls 22 and 23 carry cutting edges 24 and 25 respectively which are adapted to scrape, shave, and burnish the side walls of the work piece after the bottom cutting edges 26, 27, 28, and 29 have cut away the side wall areas of the work piece around the preformed hole in the work piece and it is to be noted that the cutting edges 26—28 are formed on the same plane as the cutting edge 24 and that the cutting edges 27 and 29 are formed on the same plane as the cutting edges 25 so that in sharpening the tool, the dead center 30 forms a base for placing a center therein for holding the tool steady while sharpening.

In operation, the tool is mounted in a machine such as a fluid-fitted drill-press or milling machine and the collet end 11 is secured thereto with the central chamber 13 connected to the fluid feed on the machine so that cooling and flushing fluid is projected through the chamber 13 at a high pressure. The tool is then advanced to the work piece 31 where the cutting edges 26 through 29 initially engage the walls of the work piece to enlarge the hole to the desired size while the following side wall cutting edges 24 and 25 follow behind and scrape, burnish, and finish size the hole by removing any shavings, scrapings, high spots, or malformations due to the lead rate or feed of the tool through the work piece.

The fluid feeding down through the shank chamber 13, such as seen in Fig. 3, is forced through the orifices 14 and 15 under high pressure into the chambers 16 and 17, respectively and it is to be noted that the jet stream emitting therefrom is directed downwardly in the cavities 16 and 17 in a jet stream past the cutting edges 24 and 25 and then past the cutting edges 26—29, and since the jet stream of flushing and cooling fluid is immediately adjacent these edges any chips, shavings, etc. collected by the cutting edges are removed and subjected to a jet influence whereby they are broken off and/or flushed out of the cavities 16 and 17 to the preformed hole 32 in the work piece to disposal.

This jet stream of fluid not only cools the work piece side walls and the tool cutting edges but also is adapted to break off chips and flush out shavings and grindings so that the cutting area is always in clean condition eliminating chip jamming and scoring and it is to be further noted that since the cooling effect of the jet stream is extremely efficient, the hot chips are immediately cooled and broken off and flushed out through the preformed hole 32 thereby keeping the working area of the drill completely clean at all times.

Relative to the direction of flow, it is to be noted that no back channelling of the fluid can possibly occur due to the fact that the raised side wall areas 18 and 19 interspaced between the normal side wall areas 20 and 21 ride against the side wall of the work piece at a pressed relationship so that the fluid is completely sealed within the cavity at the top and sides and so that the fluid must flow past the side wall and out through the previously preformed hole 32 in the work piece. It is to be understood that a sufficient amount of lubricant fluid can feed back in the spaces 34 and 35 but due to the fact that no pressure can possibly exist in these spaces there is no possibility of oil squirting up in the direction opposite the drill feed.

The raised areas 18 and 19 have the additional factor of allowing the drill or tool to be firmly fixed in the hole without binding due to the fact that the normal areas 20 and 21 of the drill furnish sufficient relief to the tool in the hole. In other words, it has been found that an extremely accurate hole can be drilled by the use of the inventive device having raised areas over the normal diameter due to the fact that these raised areas ride on the side walls as a bearing and do not bind in the hole due to the fact that the normal areas interspaced between the raised areas furnish sufficient relief against friction to enable the tool to be easily turned in the hole.

The inventive tool with the features described constitutes a compact, durable, simple, and highly efficient combined hole enlarging and finishing tool which operates extremely easily in the hole and which can very easily be removed from the hole upon completion of the finishing operation whereby it saves much time, tooling, and machinery by eliminating the heretofore multiple use of tools.

Although but a single embodiment of the invention has been shown and described in detail, it is obvious that many changes may be made in the size, shape, detail, and arrangements of the various elements of the invention within the scope of the appended claims.

What is claimed is:

*1.* A hole enlarging or side wall finishing tool comprising a shank portion relatively smaller in diameter than the hole to be bored to eliminate side wall friction having a longitudinal chamber for conducting flushing and cooling fluid therethrough, a cutting tip portion on said shank portion having at least one longitudinally extending peripheral cavity in the side wall thereof and an orifice leading from the shank internal chamber to said tip cavity for conveying flushing and cooling fluid to said tip portion in the area of said cavity; said tip portion having raised peripheral side areas on either side of said cavity and a raised peripheral top area across the top of said tip cavity interconnecting with said raised side areas; said raised areas being disposed on a diameter equal to the hole to be bored and adapted to sealably engage the internal side wall of a workpiece to provide a bearing surface and to prevent back channelling of flushing and cooling fluid from said tip cavity to eliminate chips jamming and to direct the entire flow of fluid past the cutting area and chip developing area of the tool to flush chips away from the tool and to cool the cutting edges.

*2. A hole enlarging and finishing tool comprising a shank portion relatively smaller in diameter than the hole after enlarging and finishing with said tool to eliminate side wall friction, said shank portion having a longitudinal chamber for conducting flushing and cooling fluid therethrough, a cutting tip portion on said shank portion having a plurality of cutting edges extending transversely of the terminal end of said tip portion and a plurality of longitudinally extending peripheral cavities in the side wall thereof corresponding to said cutting edges, each cavity having a side wall which extends longitudinally of said tip portion, each cutting edge being disposed at the end of the side wall of the cavity corresponding to said cutting edge, said tip portion including a plurality of orifices leading from the shank internal chamber to said cavities for conveying flushing and cooling fluid to said cavities in a direction from said shank portion toward the terminal end of said tip portion so that fluid from said orifices is directed longitudinally of said cavity walls so that it flows across the leading sides of said cutting edges, said tip portion having raised peripheral side areas on either side of each of said cavities, said raised areas being disposed on a diameter substantially equal to the hole to be bored and adapted to engage the internal side wall of a workpiece to provide a bearing surface to eliminate chips jamming and to direct the flow of fluid past the cutting edge and chip-developing area of the tool to flush chips away from the tool and to cool the cutting edges.*

References Cited in the file of this patent or the original patent

UNITED STATES PATENTS

| | | |
|---|---|---|
| 995,572 | Rowe | June 20, 1911 |
| 1,002,457 | Rowe | Sept. 5, 1911 |
| 1,323,278 | Hoagland | Dec. 2, 1919 |
| 2,320,333 | Pierle | May 25, 1943 |
| 2,391,396 | Denison | Dec. 25, 1945 |
| 2,610,529 | Atkinson | Sept. 16, 1952 |